3,575,950
PROCESS FOR PREPARING POLYETHYLENE HAVING IMPROVED FILM FORMING PROPERTIES
Willard P. Gleason, Jesse R. Goza, Jr., and Jerald G. Park, Longview, Tex., assignors to Eastman Kodak Company, Rochester, N.Y.
Filed Sept. 26, 1968, Ser. No. 762,851
Int. Cl. C08f 1/60, 3/04
U.S. Cl. 260—94.9                                6 Claims

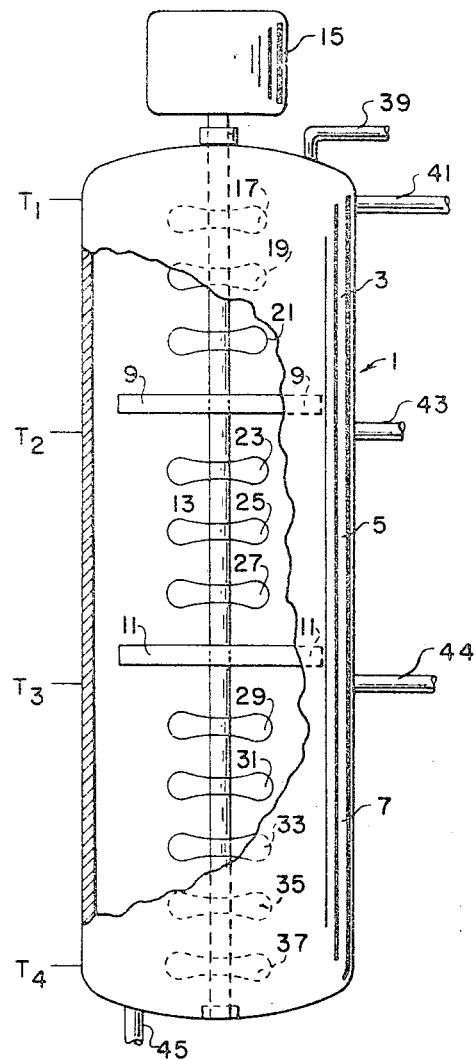

ABSTRACT OF THE DISCLOSURE

A three-stage process for preparing polyethylene employing at least one peroxide catalyst in each stage. The process produces a novel polyethylene having a density of about 0.922 to about 0.932 which finds particular utility in forming polyethylene films having improved optical properties.

---

This invention relates to a novel process for preparing polyethylene having an unexpected and improved combination of properties. One aspect of this invention relates to a novel process for producing a particular polyethylene resin having properties that make the resin particularly useful for film manufacture. Another specific aspect of this invention relates to a process employing a three-zone polymerization reactor with at least one peroxide catalyst in each stage and the novel polyethylene produced thereby.

Polyethylene has been described rather extensively in the literature, and it has been produced commercially in a variety of processes to produce polyethylene having distinct properties. These different types of polyethylene have been separately classified and distinguished primarily by the density of the polymer. The first type of polyethylene that was produced commercially was of the so-called low density type. This polyethylene has been produced for some years in accordance with the process described by Fawcett et al. in U.S. Pat. No. 2,153,551. This low density form of polyethylene is usually regarded as having a density within the range of 0.90 and 0.935 and because of the high content of amorphous polymer this type of polyethylene has relatively low hardness, low stiffness and low melting point when compared with more highly crystalline ethylene polymers.

Higher density types of polyethylene have been made and described in the literature. For example, it is known that a medium density polyethylene having a density within the range of about 0.935 to 0.945 can be produced. In recent years, it has also been discovered that a higher density and more highly crystalline type of ethylene polymer can be prepared. This high density type of polymer usually has a density within the range of about 0.945 to 0.975 and higher.

The unique properties of polyethylene have made this polymer particularly useful in the film and packaging field, and for such uses the low density form of polyethylene as contrasted with the medium and high density forms of polyethylene has been found to be the most desirable type. Low density polyethylene can be formed into a film, and it possesses the toughness required for this use. However, prior to this invention, prior art low density polyethylene, while finding acceptance in the film and packaging field, is known to be deficient in some of its properties for use in this particular field. One such deficiency is that the polyethylene when formed into a film does not possess the transparency, gloss and haze desirable for some uses in the film and packaging field. Numerous attempts have been made by those skilled in the art to improve the haze, gloss and transparency of low density polyethylene, but none of these attempts have provided a commercial process for producing polyethylene having the combination of properties of the polyethylene prepared according to this invention. In commercial applications for the production of films, the improvement in optical properties is of great significance as the customer prefers film having the best optical properties. The optical properties of films are measured by those skilled in the art by ASTM procedures for determining haze, gloss and transparency. The reduction of only 0.5 percentage haze, as determined by ASTM D–1003, over prior art polyethylenes represents a significant commercial improvement. Also, the improvement in gloss of 2 to 3 percent or more, as determined by ASTM C–346, and the improvement in transparency of 5 percent or more, as determined by ASTM D–1746, likewise represents a significant commercial improvement.

It is an object of this invention to provide a novel process, for producing polyethylene having a density below 0.935 capable of forming film having an unexpected combination of improved optical properties, such as gloss, transparency, and haze.

It is still another object of this invention to provide a process for preparing polyethylene having a density below 0.935 capable of forming films having excellent optical properties combined with excellent processing and physical properties.

Further objects of this invention will be apparent from the following description of the invention.

In accordance with this invention, polyethylene capable of being formed into films having improved clarity, gloss and transparency and having a density of about 0.922 to about 0.932, preferably 0.924 to 0.927, is prepared by polymerizing ethylene feedstock comprising ethylene and about 0.15 to about 0.40 weight percent n-heptane and about 0.15 to about 0.40 volume percent of impurities selected from the group consisting of methane, ethane, carbon dioxide, propylene and propane. The polymerization is carried out at a pressure of at least about 1100 atmospheres in a three-zone reactor equipped with stirring means and having a top reaction zone, middle reaction zone and bottom reaction zone. The ethylene feedstock is introduced in the upper portion of the top reaction zone at a temperature of about 20 to 90° C. and polymerized at a temperature of about 150 to 175° C. using diisopropyl peroxydicarbonate as a catalyst. The reaction mixture is passed from the top reaction zone to the middle reaction zone and polymerized at a temperature of about 175 to 210° C. using a peroxide catalyst that has a half life of .05 to 4 seconds within the temperature range of 175 to 210. Half life determined by the method described by Raley et al. JACS, vol. 70, p. 1336 (1948). The preferred middle reaction zone catalyst is tertiary butyl peroxyisobutyrate. Other catalysts which may be used are, for example, tertiary butyl peroxy crotonate, decanoyl peroxide, lauroyl peroxide and caprylyl peroxide. The reaction mixture of the middle reaction zone is passed from the middle reaction zone to the bottom reaction zone and polymerized at a temperature of 235–285° C. using ditertiary butyl peroxide as a catalyst.

In practicing the invention, ethylene is polymerized in three distinct reaction zones, using at least one catalyst in each reaction zone and different reaction zone temperatures. One such process can be conducted in a reactor having separate reaction zones preferably separated by baffles or other separation means. It is preferable to employ an elongated reactor separated into three distinct reaction zones by two baffles and having a stirring or agitating means extending through the three reaction zones. This agitating means is important to provide excellent mixing of the ethylene, catalyst and polymerized ethylene in order to obtain the maximum amount of reaction with a minimum amount of catalyst. In order to obtain this type of agitation, it is preferable that the stirring means extend through the center of the reactor. However, the process can be carried out in three separate interconnected reactors.

It is necessary that the ethylene feedstock contain ethylene and about 0.15 to about 0.40 weight percent, preferably 0.2 to 0.3 weight percent, n-heptane and about 0.15 to 0.40 volume percent, preferably 0.20 to 0.3 volume percent, impurities in order to produce the polyethylene of the present invention.

The ethylene feedstock contains in varying amounts impurities such as methane, ethane, carbon dioxide, propylene and propane. The impurities are formed during the cracking of propane to form ethylene. The cracking of propane to form ethylene is well known in the art and is carried out in one particular process by thermal cracking of propane, which is well known in the art. The amount of impurities in ethylene formed in the cracking of propane is determined by gas chromatographic analysis and, if necessary, additional amounts of methane, ethane, carbon dioxide, propylene and propane are added to the ethylene from the cracking operation to increase the total amount of impurities to about 0.15 to about 0.40 volume percent. Some of the n-heptane can be added to the reactor as a catalyst solvent. Additional n-heptane can be added to the ethylene feedstock in order to bring the total amount of n-heptane present in the ethylene feedstock to about 0.15 to about 0.4 weight percent. It is desirable and economical to recycle ethylene to the polymerization reaction, and when the process is practiced over an extended period of time, impurities tend to accumulate in the recycle ethylene stream. The amount of n-heptane and impurities in the ethylene stream can be determined by gas chromatographic analysis, and it is desirable to control the amount of these materials in the feedstock by regular purging of the ethylene recycle line in order to maintain the desired concentration in the system.

In conducting the polymerization reaction, catalyst is introduced into the upper portion of the top, middle, and bottom reaction zones of the reactor. The top reaction zone catalyst is preferably introduced in solution in a suitable solvent or diluent. The nature of the solvent or vehicle is subject to considerable variation; but the aliphatic alkanes are desirably employed, however, the preferred catalyst solvent is a commercial grade heptane. Since n-heptane is necessary in the polymerization reaction, it can be conveniently added to the reactor as the catalyst solvent.

The middle zone catalyst is preferably introduced in solution in a suitable solvent or diluent. The preferred solvent is a mixture of white mineral oil and mineral spirits. The bottom reaction zone catalyst is also preferably added in solution in a suitable solvent such as white mineral oil.

The ethylene feedstock containing ethylene and the controlled amount of n-heptane and impurities is fed into the upper portion of the top reaction zone at a temperature of about 20–90° C. and the temperature in the first reaction zone is held within the range of 150–175° C., preferably 156–162° C., as measured near the top of the first reaction zone. The reaction mixture of the first zone is introduced into the middle reaction zone without further addition of ethylene feedstock. The middle zone catalyst is added as a 10% solution and the reaction mixture is polymerized at a temperature of 175–210° C., preferably at a temperature of 180–195° C., then introduced into the bottom reaction zone. The polymerization temperature in the bottom reaction zone using ditertiary butyl peroxide is maintained over the range of about 235° to about 285° C., preferably 250° to about 270° C. In the top of the reaction zone, the temperature is preferably about 250° C.; and, at the bottom of the reaction zone, the temperature is preferably about 270° C.

The temperature of each of three reaction zones is maintained within the specified ranges by adjusting the amount of catalyst fed to the reactor.

Within the specified reaction ranges the molecular weight or melt index of the polymer produced can be controlled by reaction pressure. For example, the melt index can be varied from about 30 to about 0.7 by varying the ethylene feedstock pressure to the top reaction zone from about 1100 to about 1475 atmospheres, respectively. Higher or lower melt indexes can be obtained by using higher or lower feedstock pressures.

The following examples are included for a better understanding of the invention.

EXAMPLE 1

The figure is a diagrammatic drawing of a three-zone reactor that can be employed in our process. Reactor 1 is separated into zones 3, 5, and 7 by baffle plates 9 and 11. The reactor is provided with an agitator 13 driven by any suitable means, such as motor 15. Agitator 13 in top reaction zone 3 has three paddle blades 17, 19, and 21. The agitator 13 in middle reactor zone 5 is also provided with three paddle blades 23, 25, and 27. The agitator 13 in the lower reaction zone 7 is provided with five paddle blades 29, 31, 33, 35, and 37. During the polymerization, ethylene ethylene containing controlled amounts of n-heptane and impurities is fed to reaction zone 3 via line 39. Diisopropyl peroxy dicarbonate enters reaction zone 3 via line 41. Tertiary butyl peroxyisobutyrate enters middle reaction zone 5 via line 43. Ditertiary butyl peroxide enters lower reaction zone 7 via line 44. The temperatures for the reaction are maintained by observing the temperatures at points designated as $T_1$, $T_2$, $T_3$, and $T_4$. The reaction product is removed from reactor 1 via line 45 and the solid reaction product is then separated from the reaction mixture. Unreacted ethylene can be recovered from the reaction mixture and recycled to reactor 1.

Ethylene is compressed to 1320 atmospheres and fed to the top reaction zone at a temperature of about 77° C. and an ethylene feed rate of 24,300 pounds per hour. About 6.5 pounds per hour of di-isopropyl peroxy dicarbonate is fed is as 25 weight percent solution in commercial grade n-heptane. Temperature $T_1$ is held at 157° C. About .4 pound per hour of tertiary butyl peroxyisobutyrate as a 10 weight percent solution in mineral spirits-mineral oil solution is fed into the middle reaction zone. Temperature $T_2$ is held at 184° C. About .24 pound per hour of ditertiary butyl peroxide as a 10 weight percent solution in white mineral oil is fed into the bottom reaction zone. Temperatures $T_3$ and $T_4$ are held at 254° C. and 268° C., respectively.

The polymer and unreacted ethylene are led from the bottom reaction zone to a separator at 250 atmospheres and, after separation, unreacted ethylene is recycled. The molten polymer is then passed to an extrusion hopper and pelleted.

In Table I the physical properties of polyethylene prepared according to this invention are compared with closely related polyethylenes. Run 1 gives the properties of polyethylene prepared according to Example 1. Run 2 gives the properties of polyethylene prepared according to Example 1 except that the middle reaction zone catalyst is omitted. Run 3 gives the properties of polyethylene prepared according to Example 1 except that the middle reaction zone temperature is increased. In Run 2 it is noted that film prepared from polyethylene produced without the middle zone catalyst has poor haze properties. In Run 3, the middle zone reaction temperature is 212° C. and produces polyethylenes having poor transparency as compared with polyethylene produced according to the invention.

TABLE I

| Run | 1 | 2 | 3 |
| --- | --- | --- | --- |
| Melt Index (ASTM D-1238) | 1.40 | 1.40 | 1.40 |
| Density (ASTM D-1505)[1] | 0.924 | 0.923 | 0.925 |
| Film properties:[2] | | | |
| Transparency (ASTM D-1746 using a receptor slit having a width of .005 rather than standard .020) | 57 | 53 | 51 |
| Haze (ASTM D-1003) | 4.2 | 7.0 | 4.0 |
| Gloss (ASTM C-346-59) | 78 | 71 | 71 |

[1] Density determined on an annealed sample which was annealed by heating the sample to 155° C.±5° C. and maintained at this temperature for a period of one hour. The sample was cooled at a rate of 7°±3° C. per hour to 23° C.
[2] Properties measured on blown film of 1½ mil thickness prepared by extrusion on a 1½ inch Modern Plastics Machinery extruder using a circular 3 inch die at a temperature of 165° C. and an extrusion rate of 75 grams polyethylene per minute.

EXAMPLE 2

Table II compares the properties of polyethylene prepared according to the present invention with polyethylenes prepared by modifying the process of the present invention. Run 1 is polyethylene prepared according to Example 1. In Run 2, 75% of the ethylene feed stock is added to the top reaction zone and 25% to the bottom reaction zone. In Run 3, 50% of the ethylene feed stock is added to the top reaction zone and 50% to the bottom reaction zone. It is noted in Runs 2 and 3 that the addition of the feed stock to reaction zones other than the top reaction zone lowers the optical properties of film formed from the polyethylene. It is noted that the temperature of the middle reaction zone has to be increased in order to sustain the reaction, as the addition of feed stock to the bottom reaction zone lowers the reaction zone temperature and terminates the reaction.

TABLE II

| Run | 1 | 2 | 3 |
| --- | --- | --- | --- |
| Melt Index (ASTM D-1238) | 1.40 | 1.70 | 1.77 |
| Density (ASTM D-1505)[1] | 0.924 | 0.922 | 0.923 |
| Temperatures,° C.: | | | |
| No. 1 | 157 | 159 | 160 |
| No. 2 | 184 | 220 | 220 |
| No. 3 | 254 | 254 | 233 |
| No. 4 | 268 | 264 | 263 |
| Film properties:[2] | | | |
| Transparency (ASTM D-1746 using a receptor slit having a width of .005 rather than standard .020) | 57 | 51 | 37 |
| Haze | 4.2 | 5.3 | 6.0 |
| Gloss | 78 | 65 | 60 |

[1] Density determined on an annealed sample which was annealed by heating the sample to 155° C.±5° C. and maintained at this temperature for a period of one hour. The sample was cooled at a rate of 7°±3°C. per hour to 23° C.
[2] Properties measured on blown film of 1½ mil thickness prepared by extrusion on a 1½ inch Modern Plastics Machinery extruder using a circular 3 inch die at a temperature of 165° C. and an extrusion rate of 75 grams polyethylene per minute.

EXAMPLE 3

Table III compares the properties of polyethylene prepared according to the present invention with polyethylenes prepared by modifying the process of the present invention. Runs 1 and 2 compare the polyethylenes produced under identical conditions except that the feedstock impurities in Run 2 are increased to 0.42 percent. It is noted that increasing the impurities above 0.4 percent adversely affects the optical properties of the film.

TABLE III

| Run | 1 | 2 |
| --- | --- | --- |
| Melt Index (ASTM D-1238) | 1.6 | 1.5 |
| Density (ASTM D-1505)[1] | 0.924 | 0.924 |
| Volume percent inerts | 0.32 | 0.42 |
| Film properties:[2] | | |
| Transparency (ASTM D-1746 using a receptor slit having a width of .005 rather than standard .020) | 43 | 40 |
| Haze | | |
| Gloss | 76 | 69 |

[1] Density determined on an annealed sample which was annealed by heating the sample to 155° C. ±5° C. and maintained at this temperature for a period of one hour. The sample was cooled at a rate of 7° ±3° C. per hour to 23° C.
[2] Properties measured on blown film of 1½ mil. thickness prepared by extrusion on a 1½ inch Modern Plastics Machinery extruder using a circular 3 inch die at a temperature of 165° C. and an extrusion rate of 75 grams polyethylene per minute.

The process of the present invention provides polyethylene having a combination of properties that have not been obtainable heretofore. The novel polyethylene can be formed into films having improved clarity, transparency and gloss.

Although the invention has been described in considerable detail with particular reference to certain preferred embodiments thereof, variations and modifications can be effected within the spirit and scope of the invention as described hereinabove and as defined in the appended claims.

We claim:

1. A process for preparing polyethylene capable of being formed into films having improved haze, gloss and transparency and having a density of about 0.922 to about 0.932 which comprises polymerizing at a pressure of about 1100 to about 1500 atmospheres ethylene feedstock comprising ethylene containing about 0.15 to about 0.40 weight percent n-heptane and about 0.15 to about 0.40 volume percent of impurities selected from the group consisting of methane, ethane, carbon dioxide, propylene, and propane in a reactor equipped with stirring means, said reactor being separated into top reaction zone, middle reaction zone, and bottom reaction zone, all of said ethylene feedstock being introduced to said reactor at a temperature of about 20 to about 90° C. in the upper portion of said top reaction zone and polymerized at a temperature of about 150 to 175° C. using diisopropyl peroxydicarbonate as a catalyst to form a reaction mixture, said reaction mixture being passed from said top reaction zone to said middle reaction zone and polymerized at a temperature of about 175 to 210° C. using a middle zone peroxide catalyst having a half life of .05 to 4 seconds within the temperatures from 175 to 210° C. said reaction mixture of said middle reaction zone being passed from said middle zone to said bottom reaction zone and polymerized at a temperature of 200 to 280° C. using as a catalyst ditertiary butyl peroxide.

2. A process according to claim 1 wherein said middle zone peroxide catalyst is a peroxide selected from the group consisting of tertiary butyl peroxyisobutyrate, tertiary butyl peroxy crotonate, decanoyl peroxide, lauroyl peroxide and caprylyl peroxide.

3. A process according to claim 2 wherein said middle zone peroxide catalyst is tertiary butyl peroxyisobutyrate.

4. A process according to claim 3 wherein said ethylene feedstock comprises ethylene containing about 0.2 to about 0.3 weight percent n-heptane and about 0.2 to about 0.3 volume percent of impurities selected from the group consisting of methane, ethane, carbon dioxide, propylene and propane.

5. A process according to claim 4 wherein said ethylene feedstock is introduced to said reactor at a temperature of about 65 to about 90° C.

6. A process according to claim 5 wherein said ethylene feedstock is polymerized at a pressure of about 1200 to about 1500 atmospheres.

References Cited

UNITED STATES PATENTS

| | | | |
|---|---|---|---|
| 2,921,059 | 1/1960 | Guillet et al. | 260—94.9 |
| 2,932,632 | 4/1960 | Barry et al. | 260—94.9 |
| 2,964,515 | 12/1960 | Roder | 260—94.9 |
| 3,293,233 | 12/1966 | Erchok et al. | 260—94.9 |

FOREIGN PATENTS 1,109,611    4/1968    Great Britain.

JOSEPH L. SCHOFER, Primary Examiner

E. J. SMITH, Assistant Examiner